(12) United States Patent
Nish et al.

(10) Patent No.: US 6,435,775 B1
(45) Date of Patent: Aug. 20, 2002

(54) BUOYANCY SYSTEM WITH BUOYANCY MODULE SEAL

(75) Inventors: Randall W. Nish, Provo; Daniel C. Kennedy, II, Salt Lake City, both of UT (US)

(73) Assignee: EDO Corporation, Fiber Science Division, Salt Lake City, UT (US)

( * ) Notice: Subject to any disclaimer, the term of this patent is extended or adjusted under 35 U.S.C. 154(b) by 0 days.

(21) Appl. No.: 09/576,404

(22) Filed: May 22, 2000

(51) Int. Cl.[7] .......................... E21B 7/132; F16L 17/06
(52) U.S. Cl. .................. 405/224.2; 405/195.1; 405/205; 405/223.1; 114/264; 166/337; 166/350; 175/8; 277/608; 277/614
(58) Field of Search .................. 405/195.1, 224, 405/224.1, 224.4, 223.1, 204, 205, 211, 216; 114/243, 230, 264, 265; 166/350, 359, 367, 337; 175/7.8; 277/320, 608, 318, 612, 614

(56) References Cited

U.S. PATENT DOCUMENTS

| | | | |
|---|---|---|---|
| 3,470,838 A | | 10/1969 | Daniell |
| 3,858,401 A | * | 1/1975 | Watkins et al. .......... 405/224.2 |
| 3,952,526 A | * | 4/1976 | Watkins et al. .......... 405/224.2 |
| 3,992,889 A | * | 11/1976 | Watkins et al. .......... 405/224.2 |
| 4,099,560 A | * | 7/1978 | Fischer et al. .............. 166/350 |
| 4,176,986 A | * | 12/1979 | Taft et al. .................... 405/211 |
| 4,390,186 A | * | 6/1983 | McGee et al. ............... 277/236 |
| 4,448,266 A | * | 5/1984 | Potts .............................. 175/7 |
| 4,630,970 A | * | 12/1986 | Gunderson et al. ......... 405/224 |
| 4,634,314 A | * | 1/1987 | Pierce .................... 166/350 X |
| 4,646,840 A | * | 3/1987 | Bartholomew et al. ..... 166/350 |
| 4,648,747 A | * | 3/1987 | Watkins et al. .......... 405/195.1 |
| 4,652,022 A | * | 3/1987 | Nichols ........................ 285/92 |
| 4,702,321 A | | 10/1987 | Horton |
| 4,821,804 A | * | 4/1989 | Pierce .......................... 166/367 |
| 5,098,132 A | * | 3/1992 | Burton ........................ 285/18 |
| 5,368,648 A | * | 11/1994 | Sekizuka .................. 277/58 X |
| 5,421,413 A | * | 6/1995 | Allen et al. .................. 166/335 |
| 5,558,467 A | | 9/1996 | Horton |
| 5,771,975 A | * | 6/1998 | Anderson et al. ........... 166/367 |
| 5,881,815 A | * | 3/1999 | Horton, III ................. 166/350 |
| 6,000,422 A | * | 12/1999 | Shigemoto .................. 137/312 |
| 6,161,620 A | * | 12/2000 | Cox et al. .................... 166/367 |
| 6,164,348 A | * | 12/2000 | Rodwell et al. ............ 141/382 |
| 6,193,441 B1 | * | 2/2001 | Fisher ...................... 405/224.4 |

FOREIGN PATENT DOCUMENTS

GB 2156407 * 10/1985 ................. 166/367

* cited by examiner

*Primary Examiner*—Heather Shackelford
*Assistant Examiner*—Jong-Suk Lee
(74) *Attorney, Agent, or Firm*—Thorpe North & Western

(57) ABSTRACT

A buoyancy system for a deep water floating platform includes at least one buoyancy module coupled to the a riser. The module may be coupled to a ring structure of an end cap coupled to the riser, or two modules may be coupled to a ring structure to couple them together. The modules have an interior flange extending into the interior cavity and abutting the ring structure. Fasteners couple the interior flange of the module to the ring structure to form an interior attachment. A seal may be formed between the flange of the buoyancy module and the ring structure, and may include a seal member disposed in a groove. A test port extends to the groove to allow testing of the seal. The module may include a material and may have a thickness that together allow a wall of the buoyancy module to expand outwardly under an internal pressure and force the flange against the ring structure to enhance sealing between the flange and ring structure.

42 Claims, 13 Drawing Sheets

BUOYANCY SYSTEM WITH BUOYANCY MODULE SEAL

BACKGROUND OF THE INVENTION

1. The Field of the Invention

The present invention relates generally to a buoyancy system for supporting a riser of a deep water, floating oil platform. More particularly, the present invention relates to a buoyancy module with an improved seal.

2. The Background Art

As the cost of oil increases and/or the supply of readily accessible oil reserves are depleted, less productive or more distant oil reserves are targeted, and oil producers are pushed to greater extremes to extract oil from the less productive oil reserves, or to reach the more distant oil reserves. Such distant oil reserves may be located below the oceans, and oil producers have developed offshore drilling platforms in an effort to extend their reach to these oil reserves.

In addition, some oil reserves are located farther offshore, and thousands of feet below the surface of the oceans. Certain floating oil platforms, known as spars, or Deep Draft Caisson Vessels (DDCV) have been developed to reach these oil reserves, examples of which are described in U.S. Pat. Nos. 4,702,321 and 5,558,467. Steel tubes or pipes, known as risers, are suspended from these floating platforms, and extend the thousands of feet to reach the ocean floor, and the oil reserves beyond.

It will be appreciated that these risers, formed of thousands of feet of steel pipe, have a substantial weight which must be supported by buoyant elements at the top of the risers. Steel air cans have been developed which are coupled to the risers and disposed in the water to help buoy the risers, and eliminate the strain on the floating platform, or associated rigging. One disadvantage with the air cans is that they are formed of metal, and thus add considerable weight themselves. Thus, the metal air cans must support the weight of the risers and themselves. In addition, the air cans are often built to pressure vessel specifications, and are thus costly and time consuming to manufacture.

In addition, as risers have become longer by going deeper, their weight has increased substantially. One solution to this problem has been to simply add additional air cans to the riser so that several air cans are attached in series. It will be appreciated that the diameter of the air cans is limited to the width of the well bays within the platform structure, while the length is merely limited by the practicality of handling the air cans. For example, the length of the air cans is limited by the ability or height of the crane that must lift and position the air can. One disadvantage with more and/or larger air cans is that the additional cans or larger size adds more and more weight which also be supported by the air cans, decreasing the air can's ability to support the risers. Another disadvantage with merely stringing a number air cans is that long strings of air cans may present structural problems themselves. For example, a number of air cans pushing upwards on one another, or on a stem pipe, may cause the cans or stem pipe to buckle.

Furthermore, air cans may develop leaks which reduce their ability to perform, or support the risers. It may be difficult to locate such leaks due to the size of the air cans and their location in the water. As stated above, air cans may be large and difficult to handle. Therefore, it may be difficult to remove and examine the air cans once they are positioned and attached to a riser. In addition, it may be difficult to test the air cans prior to installation.

SUMMARY OF THE INVENTION

It has been recognized that it would be advantageous to optimize the systems and processes of accessing distant oil reserves, such as deep water oil reserves. In addition, it has been recognized that it would be advantageous to develop a system for reducing the weight of air cans, and thus the riser system and platforms. In addition, it has been recognized that it would be advantageous to develop a system for increasing the buoyancy of the air cans. In addition, it has been recognized that it would be advantageous to prevent leaks in the buoyancy cans or system. In addition, it has been recognized that it would be advantageous to test a buoyancy system or cans for leaks prior to installation, and to monitor the buoyancy system or cans for leaks during use. In addition, it has been recognized that it would be advantageous to prevent buoyancy systems or cans from developing leaks.

The invention provides a modular buoyancy system including one or more buoyancy modules. The buoyancy modules are vertically oriented, disposed at and below the surface of the water and coupled to a riser or stem pipe to support the riser. The one or more buoyancy modules are sized to have a volume to produce a buoyant force at least as great as the riser.

A first, or upper, buoyancy module may be coupled to a ring structure of an end cap, which in turn may be coupled to the stem pipe or riser. In addition, first and second, or upper and lower, buoyancy modules may be coupled together by a ring structure.

In accordance with one aspect of the present invention, the buoyancy module advantageously may be coupled to the end cap, or the buoyancy modules advantageously may be coupled together, with internal attachments. The buoyancy modules may have interior flanges extending into an interior cavity and abutting the ring structure. Fastening means, such as bolts, may engage the ring structure and interior flange, and couple the interior flange of the buoyancy module to the ring structure to form the interior attachment.

As stated above, an upper end of the upper buoyancy module may be coupled to the ring structure of the end cap, and thus may have an upper flange. In addition, two buoyancy modules may be coupled together with the upper buoyancy module having a lower flange, and the lower buoyancy module having an upper flange, both of which are coupled to the ring structure disposed therebetween.

In accordance with another aspect of the present invention, a test port extends to the seals formed between the flanges and the ring structure. The seal may include a seal member, such as an 0-ring, disposed in a groove between the flange and ring structure. A compressor may be connected to the test port by a fluid conduit to create an increased pressure in the groove. In addition, a pressure gauge may be coupled to the test port to measure any pressure drop in the groove. In addition, a dye may be disposed between the flange and the ring structure to identify any leaks.

In accordance with another aspect of the present invention, the buoyancy modules may be configured to balloon or expand to enhance the seal between the flanges and the ring structures. The buoyancy modules may include a material and may have a thickness that together allow walls of the buoyancy modules to expand outwardly under an internal pressure. The outward expansion causes the walls to pivot slightly about the internal attachment, forcing the flange against the ring structure to enhance sealing between the flange and ring structure.

A method for testing the seal integrity of the buoyancy system includes attaching the flange of the buoyancy module to the ring structure. A pressure differential is created in the groove through the test port. Whether the seal meets predetermined specifications is then determined. Assembling and testing may be performed prior to submerging the buoyancy module. In addition, testing may be performed after submerging the buoyancy module.

In accordance with one aspect of the present invention, the riser may be over 10,000 feet long with an associated weight, and the buoyancy module advantageously may include an elongated vessel with a composite vessel wall. Preferably, the composite vessel wall advantageously has a decrease in weight when submerged between approximately 25 to 75 percent.

Additional features and advantages of the invention will be set forth in the detailed description which follows, taken in conjunction with the accompanying drawing, which together illustrate by way of example, the features of the invention.

DETAILED DESCRIPTION

Figures 1, 2:
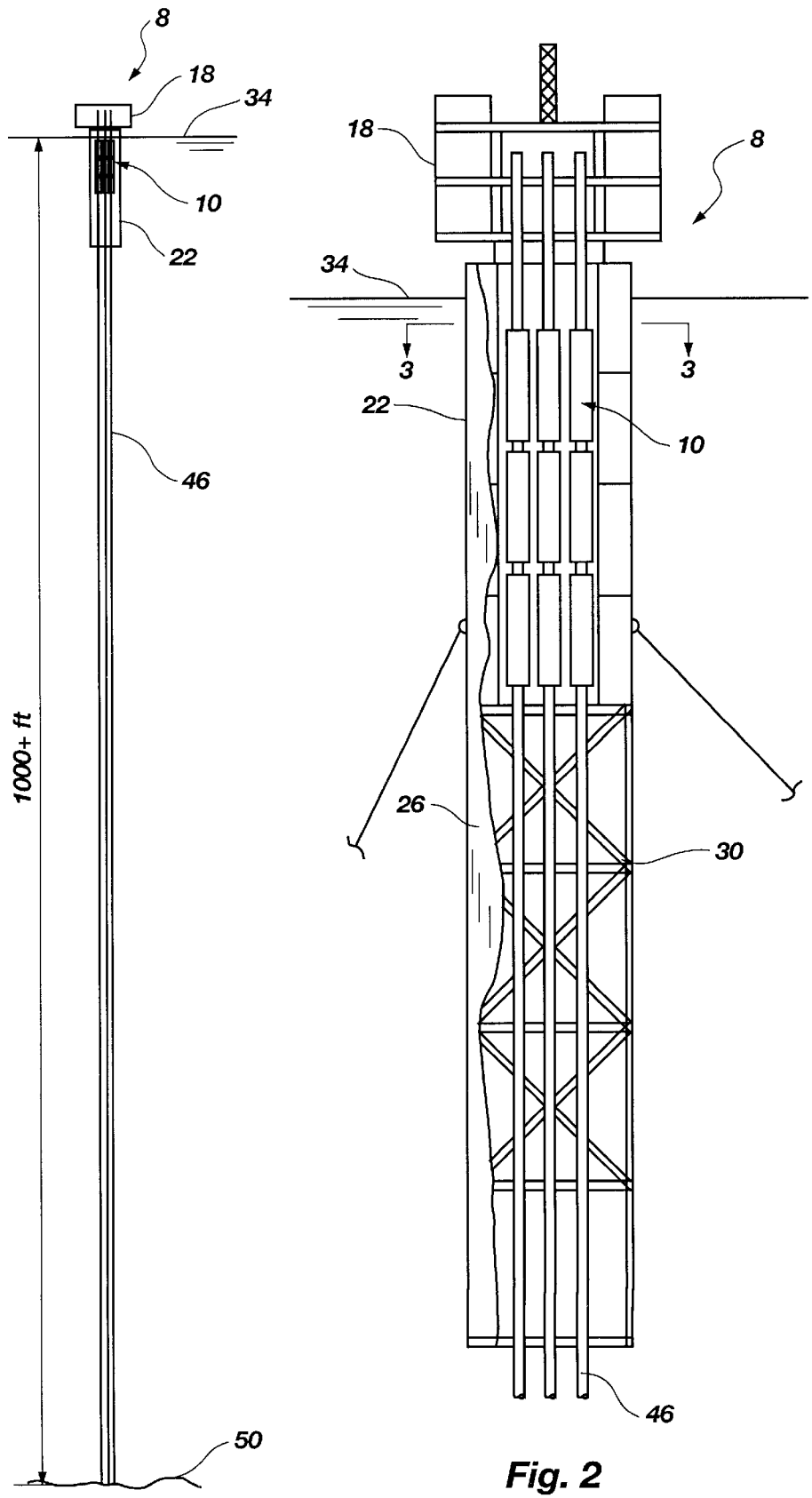
FIG. 1 is a schematic of a deep water, floating oil platform called a spar or Deep Draft Caisson Vessel with risers utilizing a modular buoyancy system in accordance with the present invention.
FIG. 2 is a partial, broken-away view of a preferred embodiment of the deep water, floating oil platform of FIG. 1 utilizing the modular buoyancy system in accordance with the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

As illustrated in FIGS. 1 and 2, a deep water, floating oil platform, indicated generally at 8, is shown with a buoyancy system, indicated generally at 10, in accordance with the present invention. Deep water oil drilling and production is one example of a field which may benefit from use of such a buoyancy system 10. The term "deep water, floating oil platform" is used broadly herein to refer to buoyant platforms located above or below the surface, such as are utilized in drilling and/or production of fuels, such as oil and gas, typically located off-shore in the ocean at locations corresponding to depths of over several hundred or thousand feet, including classical, truss, and concrete spar-type platforms or Deep Draft Caisson Vessels, etc. Thus, the fuel, oil or gas reserves are located below the ocean floor at depths of over several hundred or thousand feet of water.

A classic, spar-type, floating platform 8 or Deep Draft Caisson Vessel (DDCV) is shown in FIGS. 1 and 2, and has both above-water, or topside, structure 18, and below-water, or submerged, structure 22. The above-water structure 18 includes several decks or levels which support operations such as drilling, production, etc., and thus may include associated equipment, such as a workover or drilling rig, production equipment, personnel support, etc. The submerged structure 22 may include a hull 26, which may be a full cylinder form. The hull 26 may include bulkheads, decks or levels, fixed and variable seawater ballasts, tanks, etc. The fuel or oil may be stored in tanks in the hull. The platform 8, or hull, also has mooring fairleads to which mooring lines, such as chains or wires, are coupled to secure the platform or hull to an anchor in the sea floor.

The hull 26 also may include a truss or structure 30. The hull 26 and/or truss 30 may extend several hundred feet below the surface 34 of the water, such as 650 feet deep. A centerwell or moonpool 38 (See FIG. 3) is located in the hull 26. The buoyancy system 10 is located in the hull 26, truss 30, and/or centerwell 38. The centerwell 38 is typically flooded and contains compartments 42 (FIG. 3) or sections for separating the risers and the buoyancy system 10. The hull 26 provides buoyancy for the platform 8 while the centerwell 38 protects the risers and buoyancy system 10.

It is of course understood that the classic, spar-type or (DD CV), floating platform 8 depicted in FIGS. 1 and 2 is merely exemplary of the types of floating platforms which may be utilized. For example, other spar-type platforms may be used, such as truss spars, or concrete spars.

The buoyancy system 10 supports deep water risers 46 which extend from the floating platform 8, near the water surface 34, to the bottom 50 of the body of water, or ocean floor. The risers 46 are typically steel pipes or tubes with a hollow interior for conveying the fuel, oil or gas from the reserve, to the floating platform 8. The term "deep water risers" is used broadly herein to refer to pipes or tubes extending over several hundred or thousand feet between the reserve and the floating platform 8, including production risers, drilling risers, and export/import risers. The risers may extend to a surface platform or a submerged platform. The deep water risers 46 can be coupled to the platform 8 by a thrust plate 54 (FIG. 4) located on the platform 8 such that the risers 46 are suspended from the thrust plate 54. In addition, the buoyancy system 10 can be coupled to the thrust plate 54 such that the buoyancy system 10 supports the thrust plate 54, and thus the risers 46, as discussed in greater detail below.

Preferably, the buoyancy system 10 is utilized to access deep water reserves, or with deep water risers 46 which extend to extreme depths, such as over 1,000 feet, more preferably over 3,000 feet, and most preferably over 5,000 feet. It will be appreciated that thousand feet lengths of steel pipe are exceptionally heavy, or have substantial weight. It also will be appreciated that steel pipe is thick or dense (i.e. approximately 0.283 lbs/in$^3$), and thus experiences relatively little change in weight when submerged in water, or seawater (i.e. approximately 0.037 lbs/in$^3$). Thus, for example, steel only experiences approximately a 13% decrease in weight when submerged. Therefore, thousands of feet of riser, or steel pipe, is essentially as heavy, even when submerged.

Figure 4:
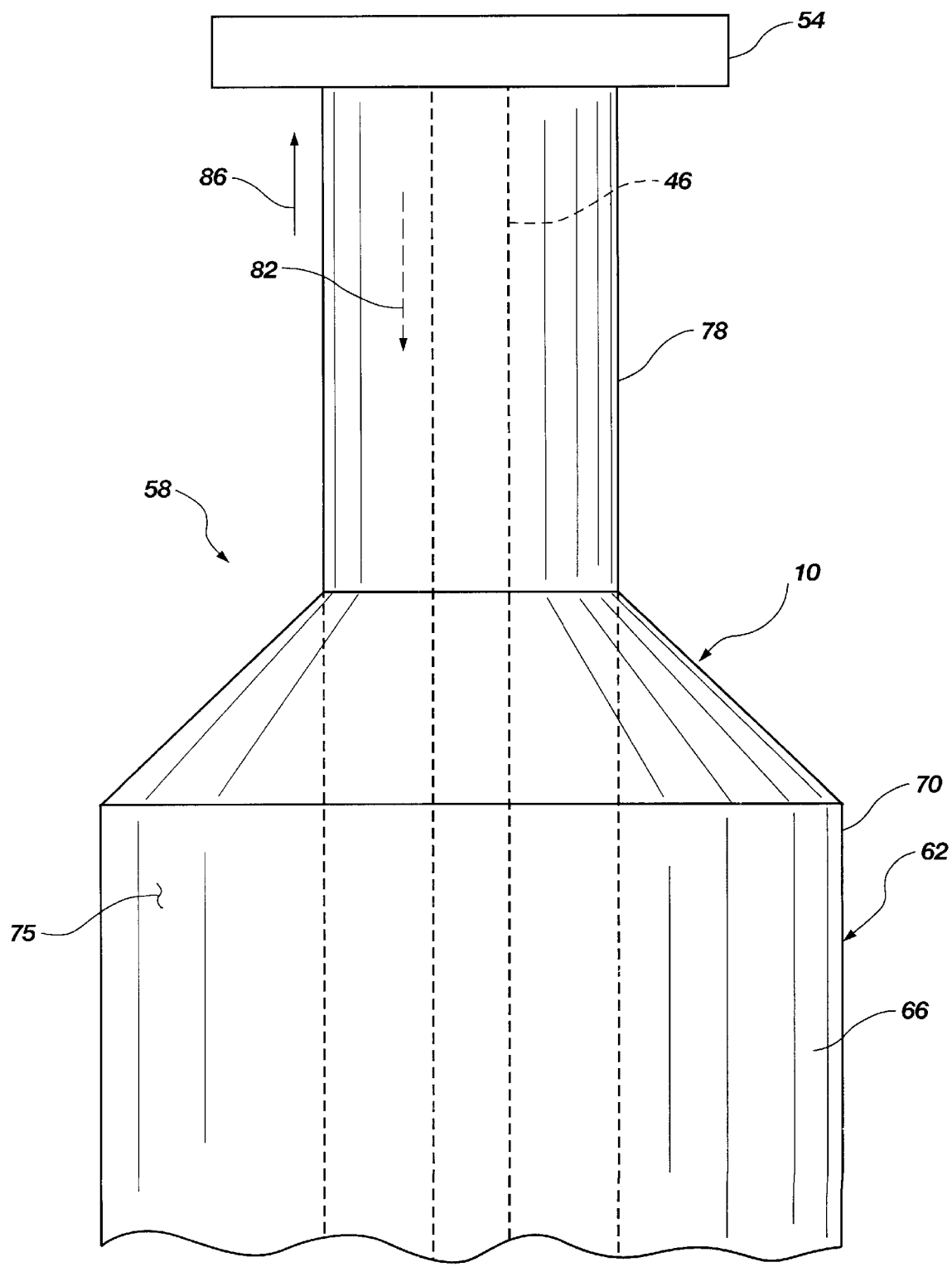
FIG. 4 is a partial side view of the modular buoyancy system in accordance with the present invention coupled to a stem pipe and riser.
Figure 5:
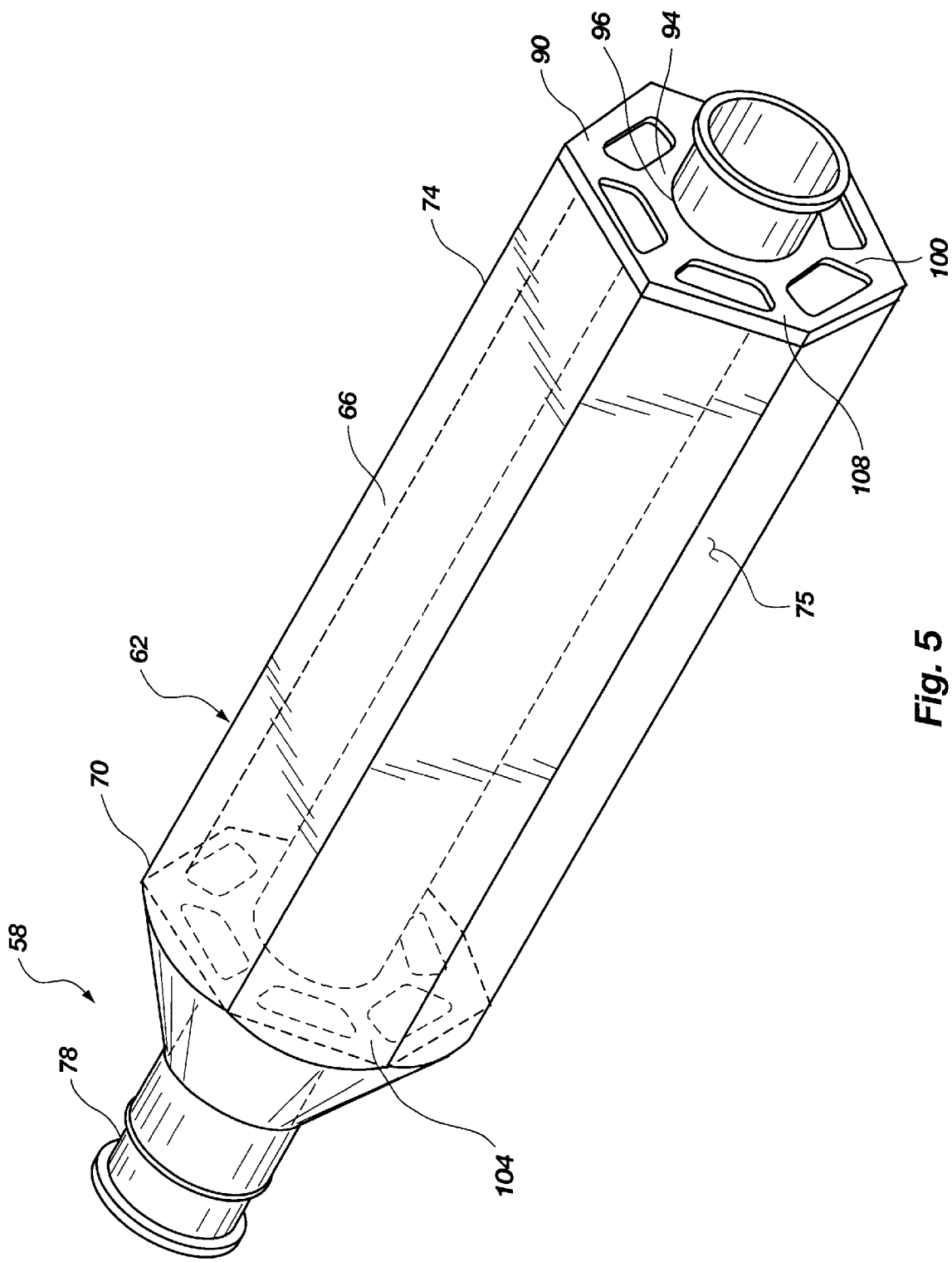
FIG. 5 is a perspective view of a composite buoyancy module in accordance with the present invention.
Figure 6:
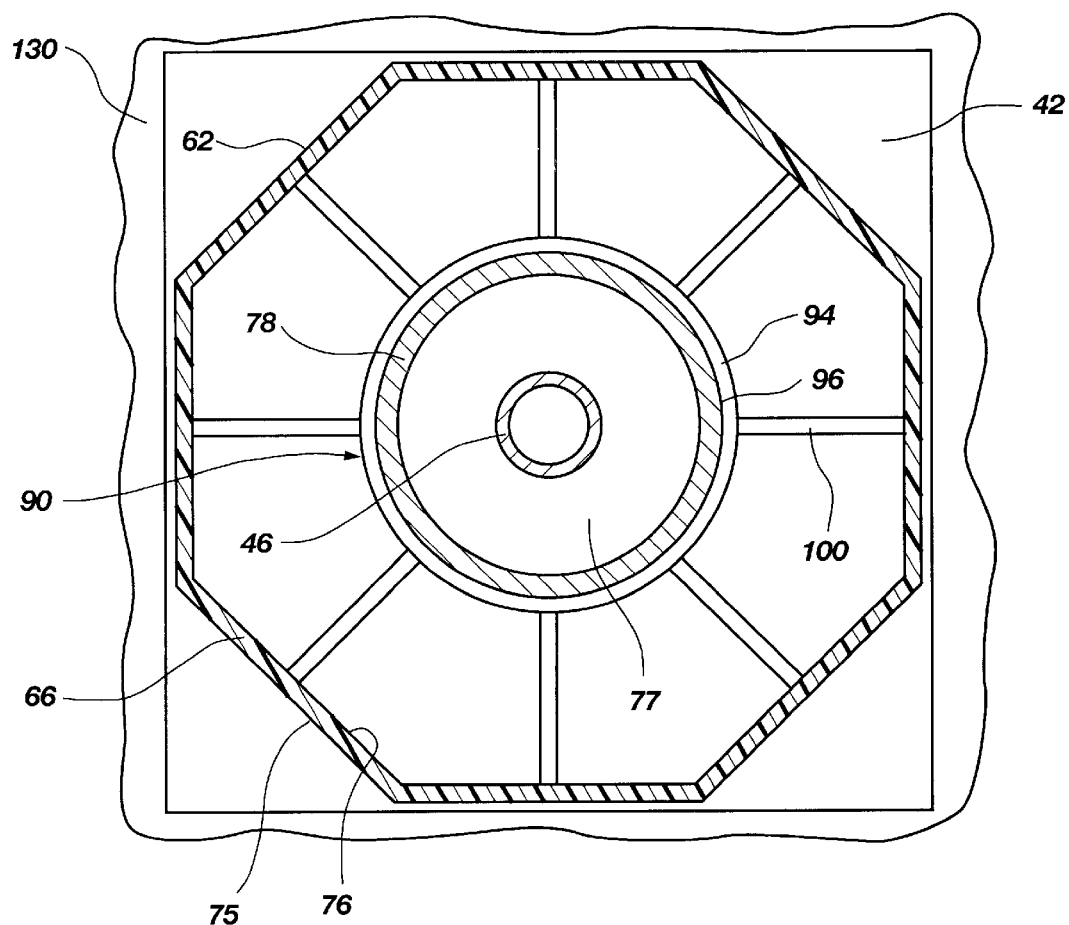
FIG. 6 is a cross-sectional view of the composite buoyancy system of FIG. 5.

The buoyancy system 10 includes one or more buoyancy modules or vessels 58 which are submerged and filled with air to produce a buoyancy force to buoy or support the risers 46. Referring to FIG. 5, the buoyancy module 58 includes an elongate vessel 62 with a wall 66 or shell. The elongate vessel 62 is vertically oriented, submerged, and coupled to one or more risers 46 via the thrust plate 54 (FIG. 4). The vessel 62 has an upper end 70 and a lower end 74. In addition, the buoyancy module 58 or vessel 62 has an exterior surface 75, an interior surface 76, and in interior cavity 77, as shown in FIG. 6.

In addition, the buoyancy module 58 may include a stem pipe 78 extending through the vessel 62 concentric with a longitudinal axis of the vessel 62. Preferably, the upper end 70 of the vessel 62 is coupled or attached to the stem pipe 78. As shown in FIG. 4, the stem pipe 78 may be directly coupled to the thrust plate 54 to couple the vessel 62 and buoyancy module 58 to the thrust plate 54, and thus to the riser 46. The stem pipe 78 may be sized to receive one or more risers 46 therethrough, as shown in FIG. 6.

Therefore, the risers 46 exert a downward force, indicated by arrow 82 in FIG. 4, due to their weight on the thrust plate 54, while the buoyancy module 58 or vessel 62 exerts an upward force, indicated by arrow 86 in FIG. 4, on the thrust plate 54. Preferably, the upward force 86 exerted by the one or more buoyancy modules 58 is equal to or greater than the downward force 82 due to the weight of the risers 46, so that the risers 46 do not pull on the platform 8 or rigging.

As stated above, the thousands of feet of risers 46 exert a substantial downward force 82 on the buoyancy system 10 or buoyancy module 58. It will be appreciated that the deeper the targeted reserve, or as drilling and/or production moves from hundreds of feet to several thousands of feet, the risers 46 will become exceedingly more heavy, and more and more buoyancy force 86 will be required to support the risers 46. It has been recognized that it would be advantageous to optimize the systems and processes for accessing deep reserves, to reduce the weight of the risers and platforms, and increase the buoyance force.

Referring again to FIG. 5, the vessel 62 preferably is a composite vessel, and the vessel wall 66 advantageously is formed of a fiber reinforced resin. The composite vessel 62 or vessel wall 66 preferably has a density of approximately 0.072 lbs/in$^3$.

Therefore, the composite vessel 62 is substantially lighter than prior art air cans. In addition, the composite vessel 62 or vessel wall 66 advantageously experiences a significant decrease in weight, or greater decrease than metal or steel, when submerged. Preferably, the composite vessel 62 experiences a decrease in weight when submerged between approximately 25 to 75 percent, and most preferably between approximately 40 to 60 percent. Thus, the composite vessel 62 experiences a decrease in weight when submerged greater than three times that of steel.

The one or more buoyancy modules 58, or vessels 62, preferably have a volume sized to provide a buoyancy force 86 at least as great as the weight of the submerged riser 46. It will also be appreciated that motion of the floating platform 8, water motion, vibration of the floating platform 8 and associated equipment, etc., may cause the risers 46 to vibrate or move. Thus, the buoyancy modules 58 or vessels 62 more preferably have a volume sized to provide a buoyancy force at least approximately 20 percent greater than the weight of the submerged risers 46 in order to pull the risers 46 straight and tight to avoid harmonics, vibrations, and/or excess motion.

Referring to FIGS. 5 and 6, the buoyancy module 58 may include one or more spider structures 90 disposed at locations along the length thereof to support the vessel 62 and/or reinforce the structure and alignment of the vessel 62 and stem pipe 78. The spider structure 90 may be attached to the vessel 62 and include an annular member 94 with an aperture 96 through which the stem pipe 78 is received. A plurality of arms 100 may be attached to and between the vessel 62 and the annular member 94. The buoyancy module 58 may include an upper spider structure 104 located at the top thereof, and a lower spider structure 108 located at the bottom thereof, as shown in FIG. 5. In addition, intermediate spider structures also may be provided.

The stem pipe 78 may be formed of a metal, such as steel or aluminum. The vessel 62, however, preferably is formed of a composite material. Thus, the materials of the stem pipe 78 and vessel 62 may have different properties, such as coefficients of thermal expansion. The composite material of the vessel 62 may have a coefficient of thermal expansion much lower than that of the stem pipe 78 and/or risers 48. Therefore, the stem pipe 78 is axially movable disposed within the aperture 96 of the spider structure 90, and thus axially movable with respect to the vessel 62. Thus, as the stem pipe 78 and vessel 62 expand and contract, they may do so in the axial direction with respect to one another. For example, the composite material of the vessel 62 may have a coefficient of thermal expansion between approximately 4.0 to 8.0×10$^{-6}$ in/in/° F. for fiberglass reinforcement with epoxy, vinyl ester or polyester resin; or of −4.4×10$^{-8}$ to 2.5×10$^{-6}$ in/in/° F. for carbon fiber reinforcement with epoxy, vinyl ester or polyester resin. In comparison, steel has a coefficient of thermal expansion between 6.0 to 7.0×10$^{-6}$ in/in/° F.; while aluminum has a coefficient of thermal expansion between 12.5 to 13.0×10$^{-6}$ in/in/° F. Thus, the composite vessel 62 advantageously has a much smaller coefficient of thermal expansion than the stem pipe 78, and experiences a smaller expansion or contraction with temperature changes.

Referring again to FIGS. 3 and 6, the floating platform 8 of hull 26 may include a centerwell 38 with a grid structure 112 with one or more square compartments 42, as described above. The risers 46 and buoyancy modules 58 are disposed in the compartments 42 and separated from one another by the grid structure 112. The compartments 42 may have a square cross-section with a cross-sectional area. The buoyancy module 58 and/or vessel 62 may have a non-circular cross-section with a cross-sectional area greater than approximately 79 percent of the cross-sectional area of the compartment 42. Thus, the cross-sectional area, and thus the size, of the buoyancy module 58 and vessel 62 are maximized to maximize the volume and buoyancy force 86 of the buoyancy module 58. The buoyancy module 58 and vessel 62 may have a polygon cross-section, such as octagonal or hexagonal. In addition, the vessel 62 may be circular.

Figure 3:
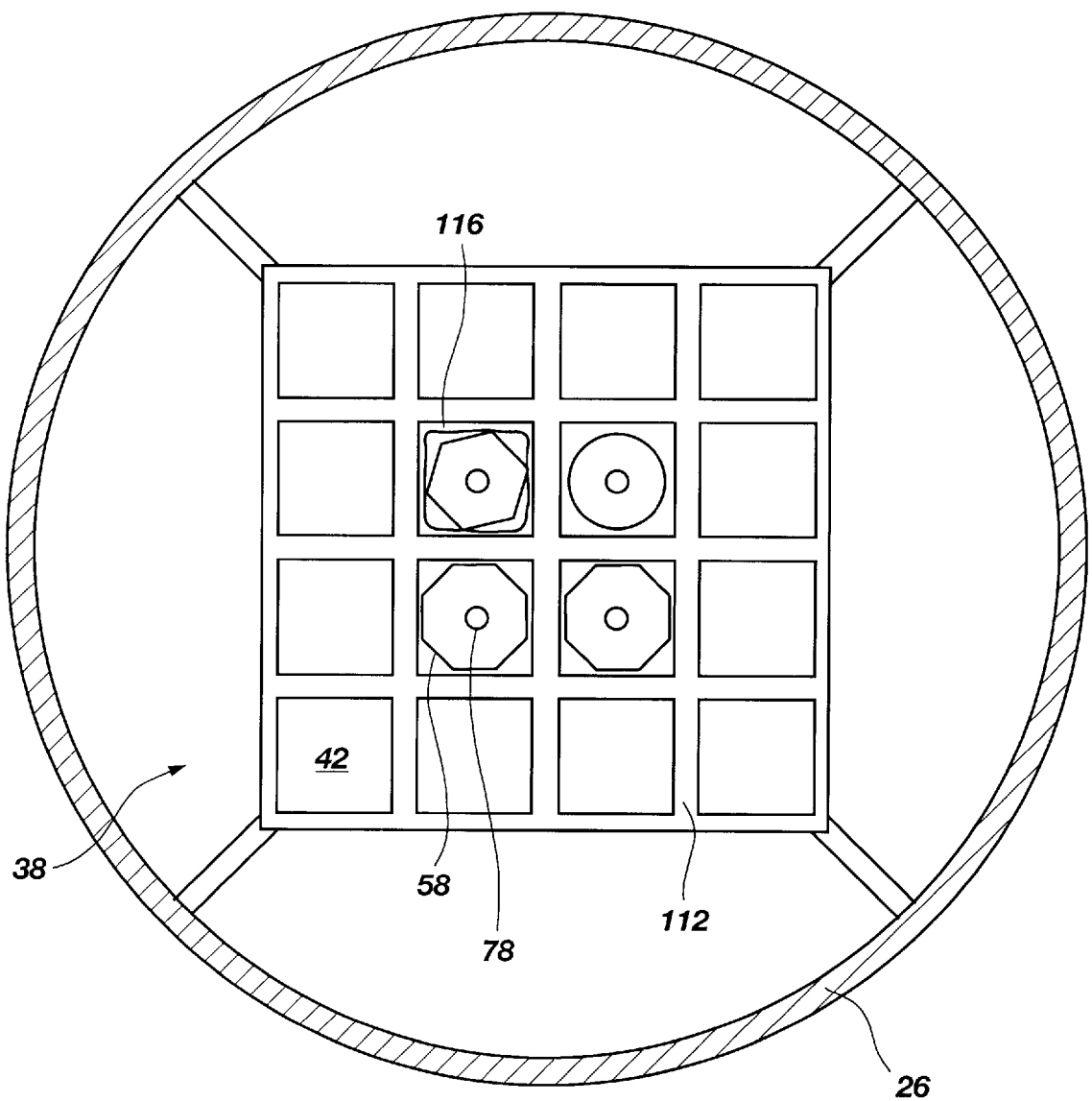
FIG. 3 is a cross-sectional view of the deep water, floating oil platform of FIG. 2 taken along line 3—3 utilizing the modular buoyancy system in accordance with the present invention.

Referring to FIG. 3, a bumper 116 may be disposed between the grid structure 112 and buoyancy module 58 to protect the buoyancy module 58 from damage as it moves within the compartment 42. The bumper 116 may be form of a flexible and/or resilient material to cushion impact or wear contact between the buoyancy module 58 and grid structure 112 as the buoyancy module 58 is installed.

Figure 7:
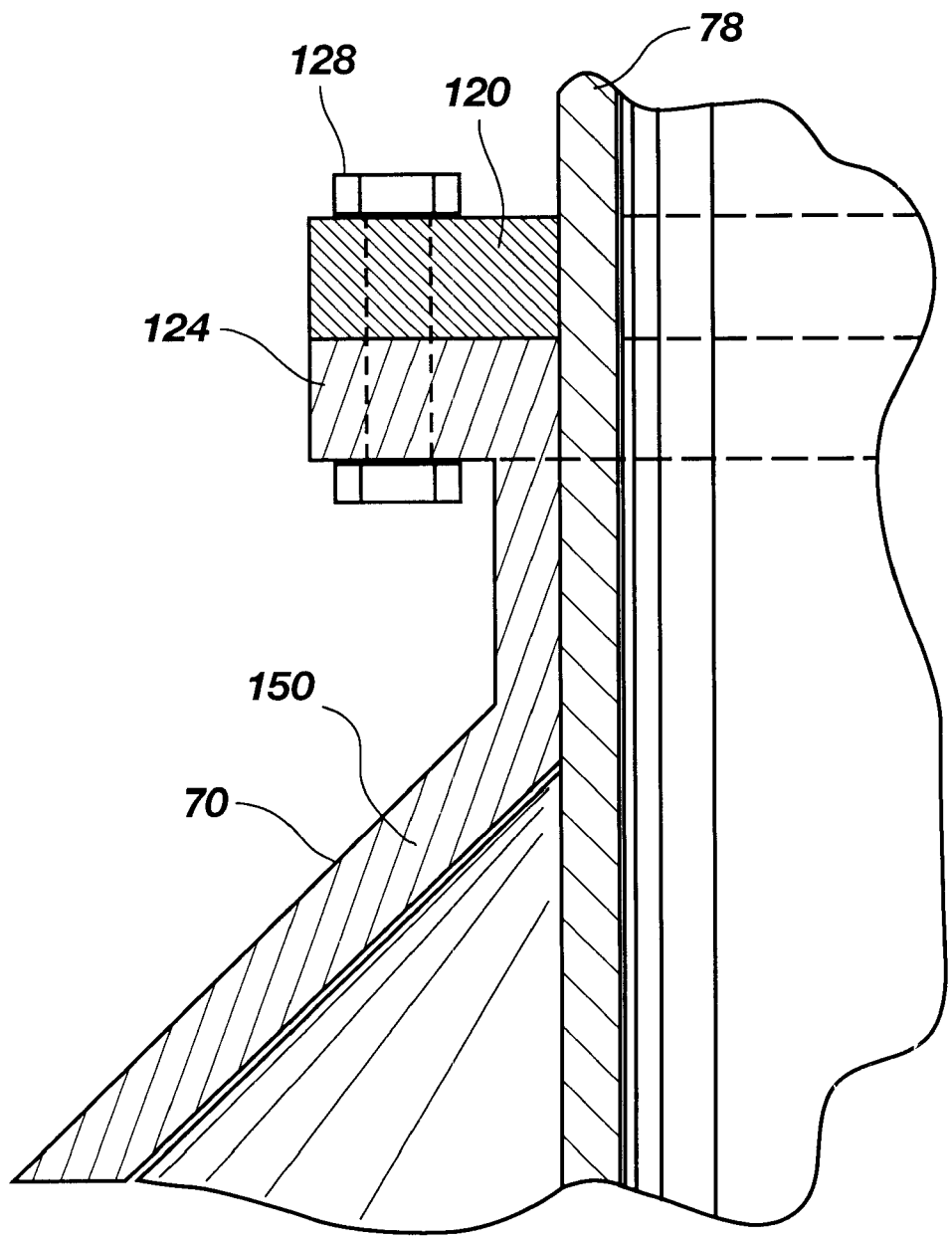
FIG. 7 is a partial cross-sectional view a top end of the modular buoyancy module of FIG. 5.

As stated above, preferably only the top end 70 of the vessel 62 is attached to the stem pipe 78. Referring to FIG. 7, an annular pipe flange 120 may be attached to the stem pipe 78. The upper end 70 of the vessel 62 may taper conically to surround the stem pipe 78, and be provided with an annular end cap flange 124 which abuts the annular pipe flange 120 of the stem pipe 78. The annular end cap flange 124 may be integrally formed with the vessel 62, or a separate piece attached to the vessel 62. The vessel 62 may be attached to the stem pipe 78 by attaching the two flanges 120 and 124 such as by bolts 128, rivets, etc. Alternatively, the two may be adhered.

Figure 8:
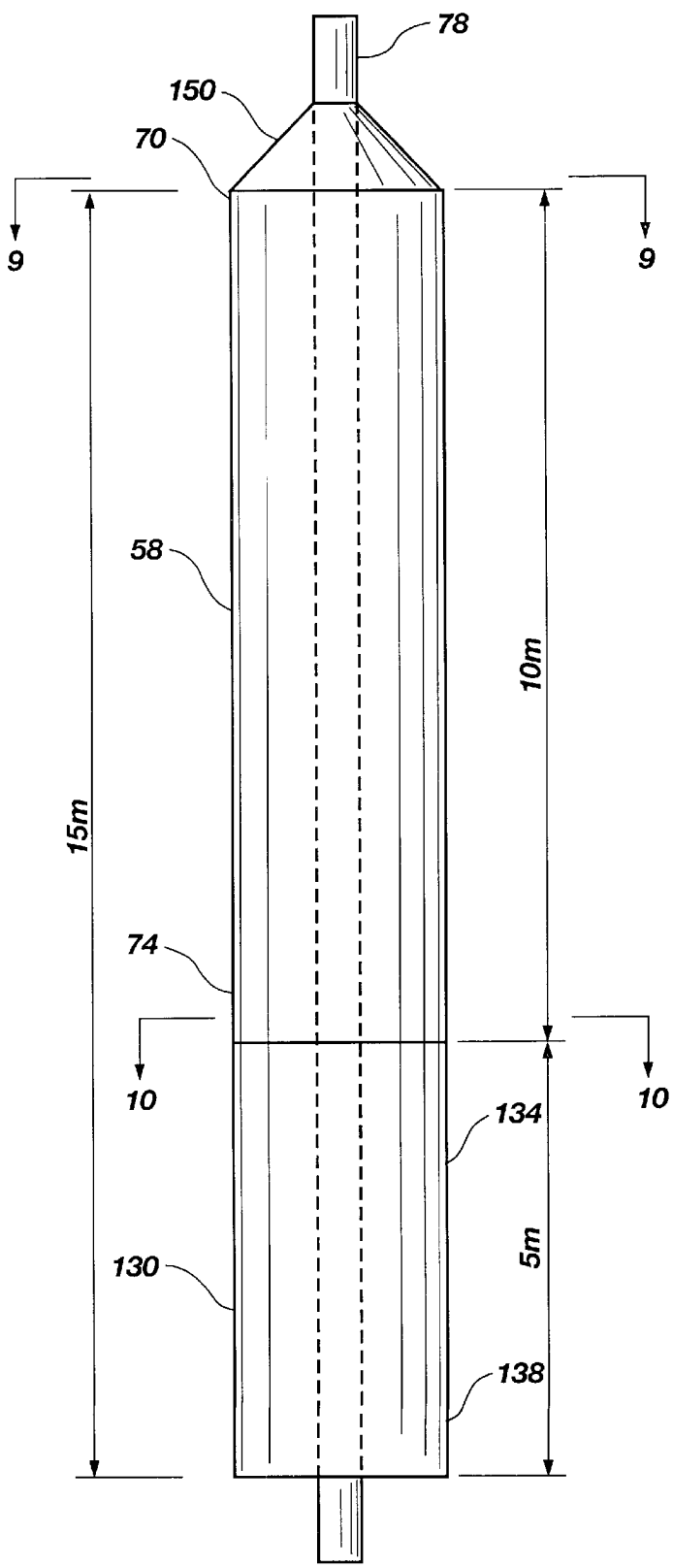
FIG. 8 is a side view of a pair of modular buoyancy modules in accordance with the present invention.

The buoyancy module 58 or vessel 62 preferably has a diameter or width of approximately 3 to 4 meters, and a length of approximately 10 to 20 meters. The diameter or width of the buoyancy modules 58 is limited by the size or width of the compartments 42 of the centerwell 38 or grid structure 112, while the length is limited to a size that is practical to handle. Referring to FIG. 8, the buoyancy system 10 advantageously may be modular, and include more than one buoyancy modules to obtain the desired volume, or buoyancy force, while maintaining each individual module at manageable lengths. For example, a first or upper buoyancy module 58 may be provided substantially as described above, while a second or lower buoyancy module 130 may be attached to the first to obtain the desired volume. The second buoyancy module 130 has upper and lower ends 134 and 138, with the upper end 134 of the second module 130 coupled to the lower end 74 of the first module 58.

For example, the first module 58 may be 10 meters long, while the second module 130 is 5 meters long to obtain a combined length of 15 meters and desired buoyancy force. It will be appreciated that the buoyancy modules 58 and 130 may be provided in manageable sizes for transportation and handling, and assembled when convenient, such as on site, to achieve the desired buoyancy force based on the length of the risers 46.

Referring to FIG. 8, the buoyancy module 58 may include an end cap 150 attached to the upper end 70 of the vessel 62. The end cap 150 may seal the upper end of the buoyancy module 58 and couple the vessel 62 to the stem pipe 78, and thus the riser. The end cap 150 may include the annular, end cap flange 124 connected to the annular pipe flange 120 of the stem pipe 78, as shown in FIG. 7.

Figure 9:
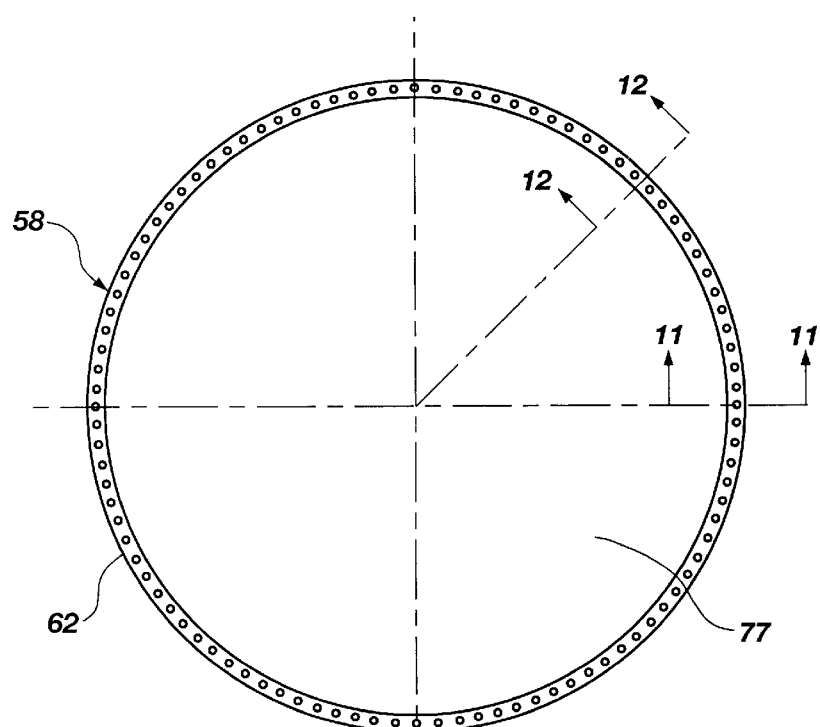
FIG. 9 is a cross-sectional end view of the pair of modular buoyancy modules taken along line 9—9 of FIG. 8.
Figure 11:
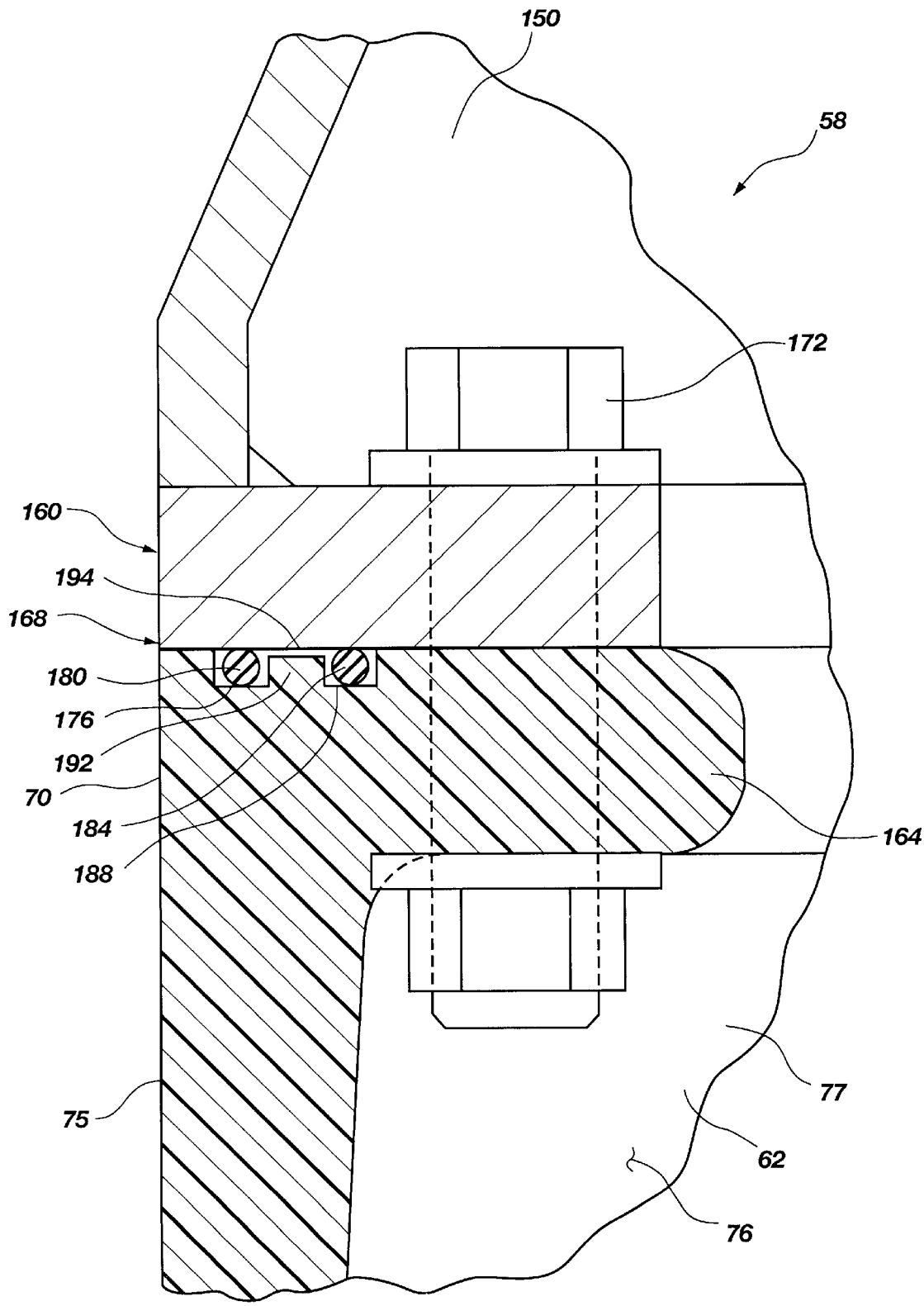
FIG. 11 is a partial cross-sectional side view of the composite buoyancy module taken along line 11—11 of FIG. 9.
Figure 12:
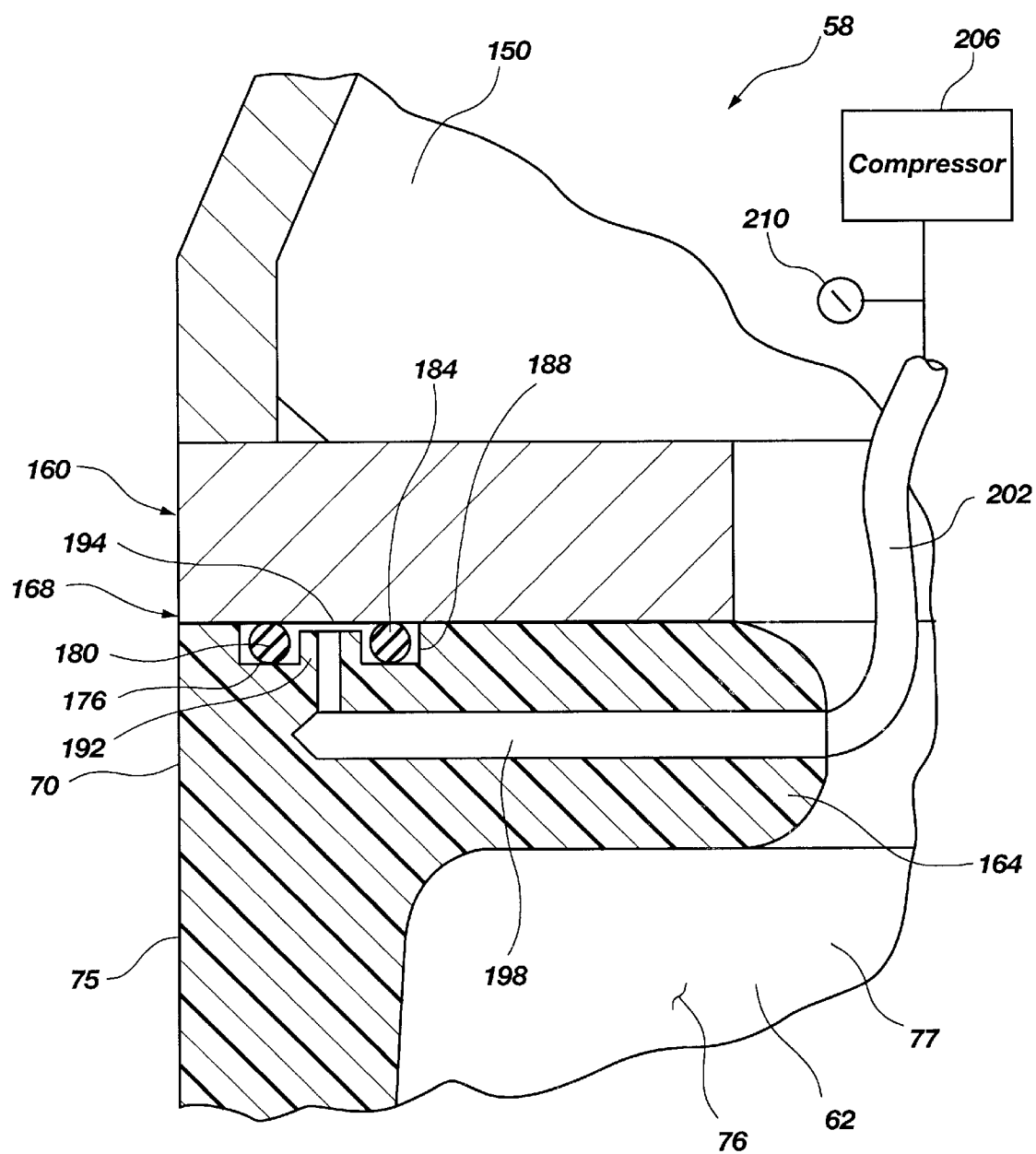
FIG. 12 is a partial cross-sectional side view of the composite buoyancy module taken along line 12—12 of FIG. 9.

Referring to FIGS. 9, 11 and 12, the end cap 150 of the buoyancy module 58 may include a ring structure 160 for attaching the buoyancy module 58 or vessel 62 to the end cap 150. The ring structure 160 may be attached to the end cap 150, such as by welding, or provided as an integral part of the end cap 150. The ring structure 160 is coupled to the stem pipe 78, and thus the riser, by the end cap 150.

The buoyancy module 58 or vessel 62 has a first, upper, interior flange 164 at the upper end 70 of the vessel, which extends inwardly into the interior cavity 77 of the vessel 62 or module 58. The flange 164 abuts the ring structure 160 and forms a seal 168 therebetween.

Bolts and nuts 172 may be used to fasten the flange 164 of the buoyancy module 58 or vessel 62 to the ring structure 160. Thus, holes or bores may be formed in both the flange 164 and the ring structure 160 which align such that the bolts 172 may extend therethrough. The bolts 172 may be tightened to squeeze the flange 164 and ring structure 160 together and form the seal 168. Bolts and nuts 172 are one example of a fastening means for coupling the flange 164 and ring structure 160. It is of course understood that other fastening means may be used, including for example, screws, rivets, clips, clamps, adhesives, welds, etc.

The flange 164 and ring structure 160 advantageously extend into the buoyancy module 58 such that the bolts 172 or fasteners are located inside the buoyancy module 58. Thus, the interior flange 164 and bolts 172 form an interior attachment. Attaching the vessel 62 and end cap 150 on the interior of the buoyancy module 58 advantageously prevents any exterior flanges which may interfere with other structures, such as the centerwell 38.

Preferably, the seal 168 advantageously is formed by at least one seal member disposed in at least one groove between the flange 164 and the ring structure 160. The seal member may be an O-ring or the like. A first groove 176 may be formed in an end surface of the vessel 62 or in the flange 164 opposite the ring structure 160. Alternatively, a groove may be formed in the ring structure 160. A first O-ring 180 may be disposed in the first groove 176, and compressed between the flange 164 and the ring structure 160 to seal the buoyancy module, or prevent leaks between the vessel 62 and the end cap 150. Similarly, a second O-ring 184 may be disposed in a second groove 188 formed in the flange 164. The first and second grooves 176 and 188 may have different diameters so that they are spaced-apart from one another.

A partition wall 192 may be formed between the two grooves 176 and 188. The partition wall 192 may be shallow to form a channel or passage 194 between the two grooves 176 and 188 so that they are in fluid communication.

Referring to FIG. 12, a test port 198 advantageously may extend to the grooves 176 and 188 to permit testing of the seal 168. The test port 198 may be formed in the vessel 62, or the flange 164. In addition, the test port 198 may extend from an inner surface 76 of the vessel to the channel or passage 194 between the grooves 176 and 188, such that the test port is in fluid communication with the grooves. Again, locating the test port 198 within the buoyancy module 58 advantageously facilitates access and prevents interference with other structures.

A fluid conduit 202 may be connected to the test port 198 and located within the vessel 62 or buoyancy module 58. A compressor 206 advantageously may be connected to the fluid conduit 202 to increase the pressure within the grooves 176 and 188. Increasing the pressure in the grooves 176 and 188 advantageously allows the seal 168 and O-rings 180 and 184 to be tested to determine if the seal 168 and/or O-rings 180 and 184 meet predetermined specifications. Thus, the end cap 150 and first buoyancy module 58 or vessel 62 may be assembled and tested prior to coupling the buoyancy module 58 to a riser and/or submerging the buoyancy module 58.

In addition, the test port 198 and fluid conduit 202 advantageously allow the seal 168 and/or O-rings 180 and 184 to be tested after installation of the buoyancy module 58, or attachment of the buoyancy module to a riser, and submersion of the buoyancy module 58. Thus, the fluid conduit 202 may extend from the test port 198 and seal 168 to the platform 18 (FIGS. 1 and 2), and the compressor 206 may be located on the platform 18. In addition, the test port 198 and fluid conduit 202 advantageously may allow the seal 168 and/or O-rings 180 and 184 to be continuously monitored.

It is of course understood that other methods may be used to test the seal 168 and/or O-rings 180 and 184. For example, any type of pressure differential may be imposed in the grooves 176 and 188. A vacuum pump, as opposed to a compressor 206, may be connected to the fluid conduit 202 to decrease the pressure in the grooves 176 and 188.

A pressure gauge 210 may be coupled to the grooves 176 and 188, such as by connection to the fluid conduit 202, to monitor pressure changes in the grooves 176 and 188. For example, the compressor 206 may increase the pressure in the grooves 176 and 188, while the pressure gauge 210 monitors any pressure drop in the grooves 176 and 188, which may indicate a compromise in the integrity of the seal 168.

In addition, the seal 168 may be visually tested. For example, a dye may be disposed in, or communicated to, the grooves 176 and 188. The compressor 206 may increase pressure in the grooves 176 and 188, causing the dye to exit the grooves 176 and 188 at any leak, thus marking the location of the failure of the seal 168.

Therefore, the integrity of the seal 168 between the end cap 150 and first buoyancy module 58 or vessel 62 advantageously may be determined during assembly, and prior to installation. In addition, the seal 168 advantageously may be tested after installation, and/or continuously monitored.

Figure 10:
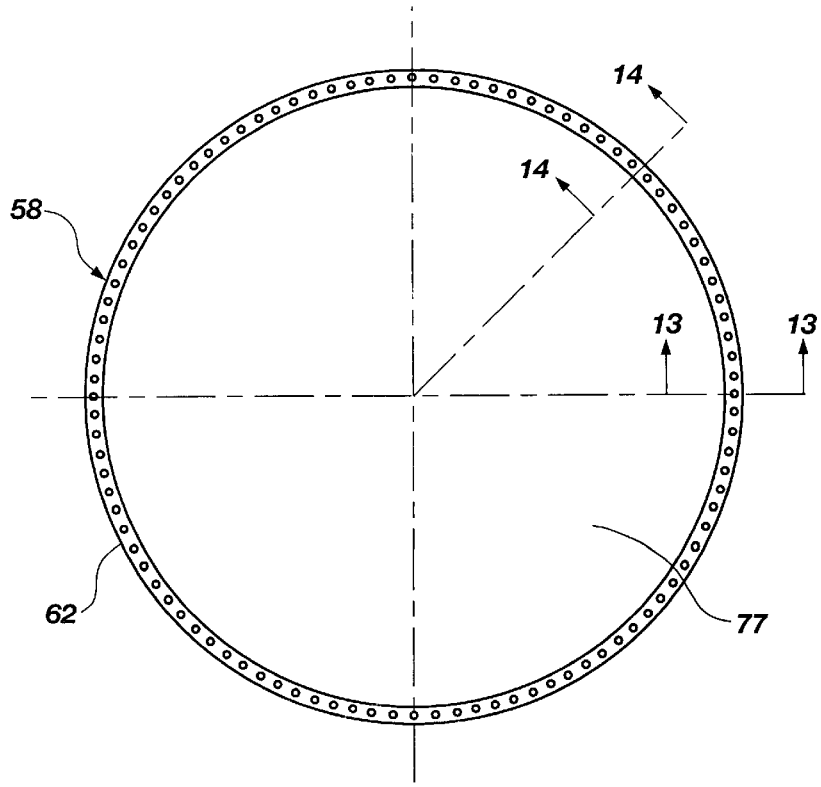
FIG. 10 is a cross sectional end view of the pair of modular buoyancy modules taken along line 10—10 of FIG. 8.
Figure 13:
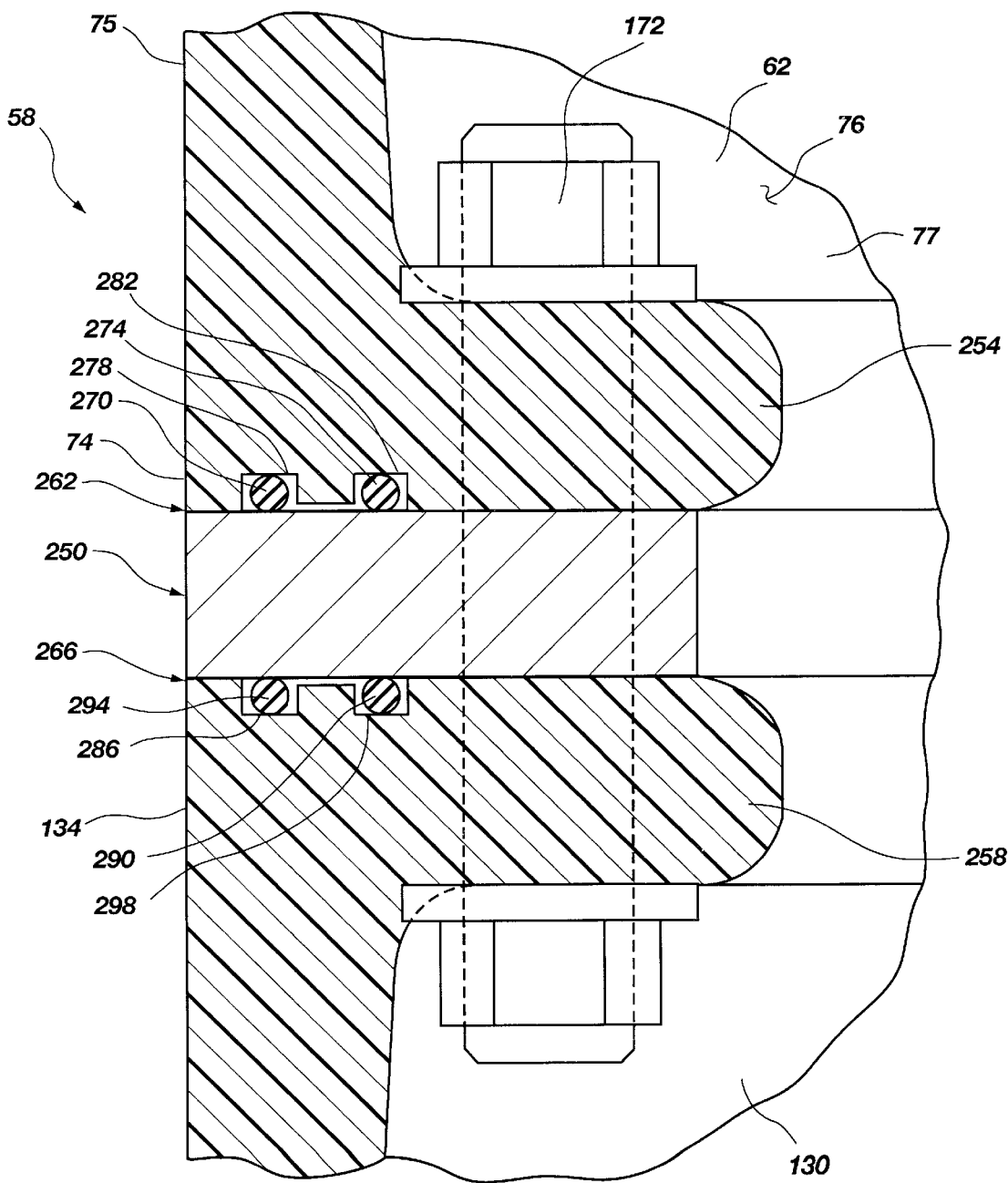
FIG. 13 is a partial cross-sectional side view of the composite buoyancy module taken along line 13—13 of FIG. 10.
Figure 14:
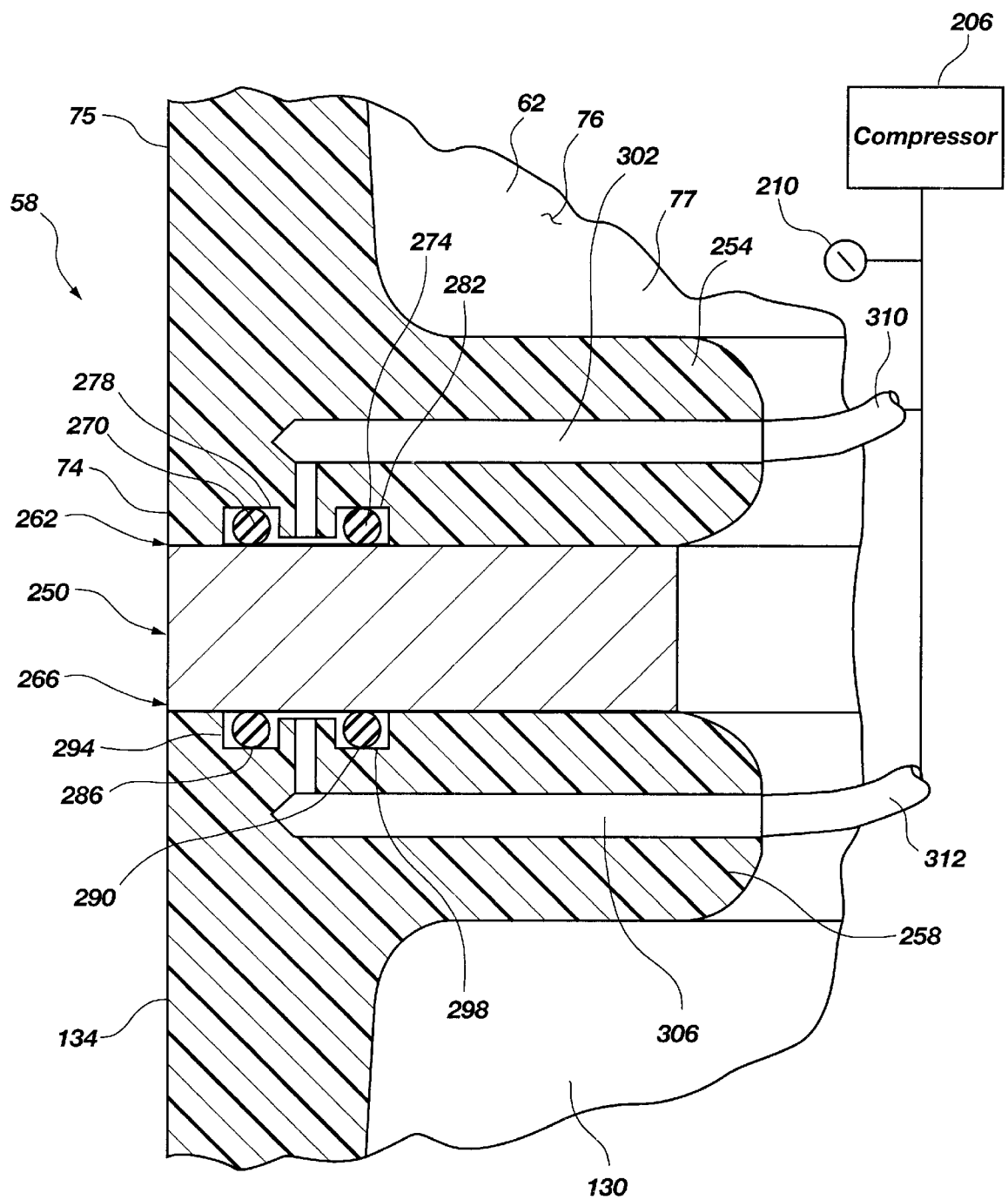
FIG. 14 is a partial cross-sectional side view of the composite buoyancy module taken along line 14—14 of FIG. 10.

Referring to FIGS. 10, 13 and 14, multiple buoyancy modules 58 and 130 may be similarly coupled. A ring structure 250 may be disposed between the two buoyancy modules 58 and 130 to couple the modules together. The ring structure 250 may be similar to the spider structures 104 and 108 (FIG. 5) described above.

A first lower flange 254 may be formed at the lower end 74 of the first buoyancy module 58 or vessel 62, which may be similar to the first upper flange 164 (FIGS. 11 and 12) described above. The flange 254 may extend inwardly into the cavity 77 of the vessel 62. Similarly, a second upper flange 258 may be formed at the upper end 134 of the second buoyancy module 130. The first and second flanges 254 and 258 abut the ring structure 250 so that the ring structure 250 is disposed between the flanges 254 and 258. Bolts and nuts 172 engage the ring structure 250 and first and second flanges 254 and 258 to fasten or couple the flanges 254 and 258 to the ring structure 250 and one another, similar to that described above.

A first seal 262 is formed between the first flange 254 and the ring structure 250, while a second seal 266 is formed between the second flange 258 and the ring structure 250. First and second upper seal members, or O-rings, 270 and 274 are disposed in first and second grooves 278 and 282 formed in the first flange 254. Similarly, first and second lower seal members, or O-rings, 286 and 290 are disposed in first and second grooves 294 and 298. The O-rings and grooves are similar to those described above.

A first test port 302 extends to the upper grooves 278 and 282 of the first buoyancy module 58 or vessel 62, while a second test port 306 extends to the lower grooves 294 and 298 of the second buoyancy module 130. The test ports 302 and 306 may be formed in the flanges 254 and 258. First and second fluid conduits 310 and 312 may be connected to the first and second test ports 302 and 306, and to the compressor 206 and pressure gauge 210.

As described above, the test ports 302 and 306 advantageously allow the integrity of the seals 262 and 266 to be tested, and/or monitored. In addition, providing test ports 302 and 306 on each side of the ring structure 250 allows any leak to be located. For example, a pressure drop in the upper grooves 278 and 282 indicated that the upper seal 262 has failed. Furthermore, all of the test ports 198, 302 and 306 along the length of the modules 58 and 130 allow any leaks to be identified, and also located. It will be appreciated that the buoyancy modules 58 and 130 are relatively long, i.e. 10 to 20 meters or more, and any leak may be difficult to locate. Thus, the multiple test ports 198, 302 and 306 disposed at each seal location allows seal failures to not only be identified, but located as well.

Figure 15:
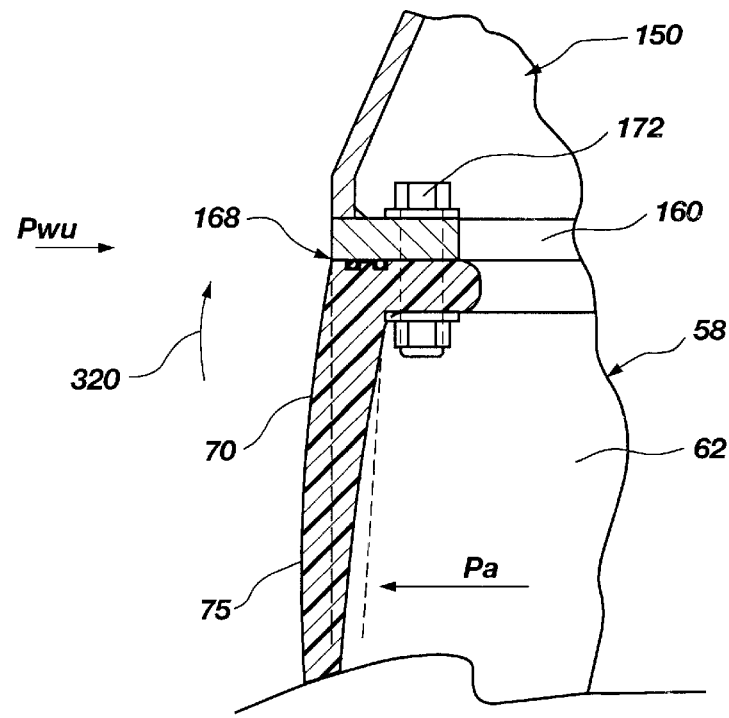
FIG. 15 is a partial cross-sectional side view of the composite buoyancy module of FIG. 8.
Figure 15:
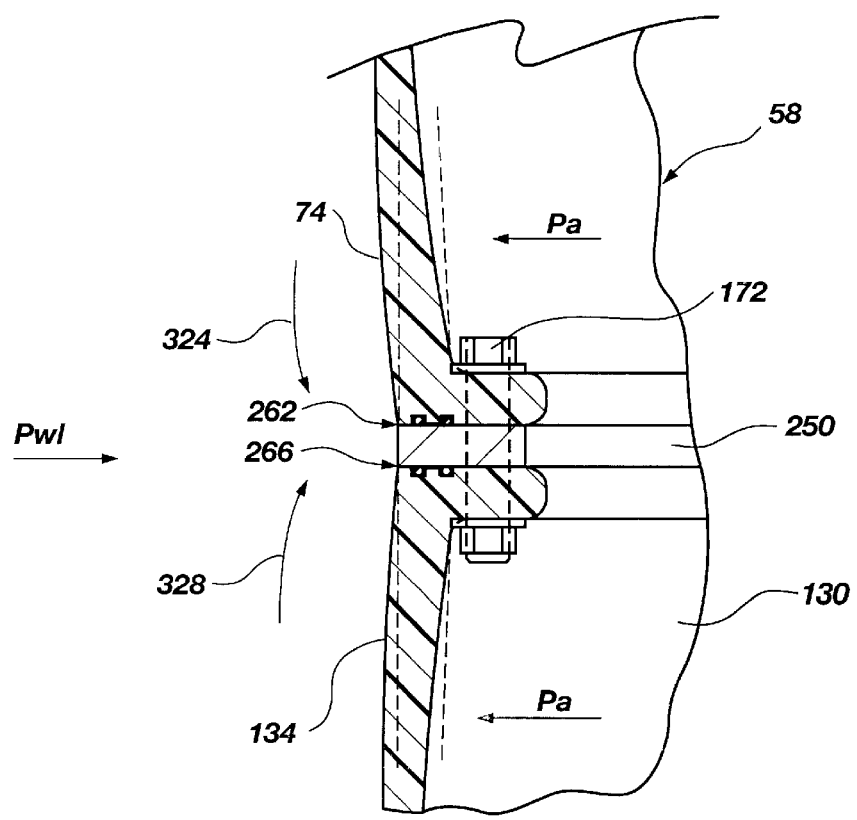

As indicated above, the risers 46 and/or platform 18 may move or sway due to motion of the water, currents, etc. Such movement may cause the buoyancy modules 58 and 130 to bend slightly. It will be appreciated that the length of the buoyancy modules 58 and 130 act as long lever arms, and that slight movement or bending may act on the lever arms producing large forces which may cause the seals 198, 302 and 306 to separate, or pull the modules 58 and 130 away from the ring structures 160 and 250. Referring to FIG. 15, the buoyancy modules 58 and 130 advantageously may be configured to expand or balloon under pressure to enhance sealing.

It will be appreciated that the upper end 70 of the buoyancy module 58 is disposed at a first, lower water pressure $P_{wu}$, while the lower end 74 of the first buoyancy module 58, or lower end 138 of the second buoyancy module 130, is disposed at a second, higher water pressure $P_{w1}$. The buoyancy modules 58 and 130 may be internally pressurized, such as by increasing the air pressure, to have an internal pressure $P_a$. The internal pressure $P_a$ may substantially equal the higher water pressure $P_{wu}$ at the lower end 74 of the first buoyancy module 58, or lower end 138 of the second buoyancy module 130. Thus, the lower end 74 or 138 may be open to the water, while the air pressure $P_a$ substantially prevents water from entering, and increases the buoyancy of the modules 58 and 130.

As stated above, the buoyancy modules 58 and 130 may be configured to expand or balloon. For example, the buoyancy modules may be formed of a material, and have wall thicknesses, which together are configured to expand under the internal pressure $P_a$ of the buoyancy modules 58 and 130. Thus, the internal pressure $P_a$ of the modules 58 and 130 may cause the walls to expand outwardly from their normal, relaxed position, shown in dashed lines, to an expanded position, shown in solid lines.

As stated above, the modules 58 and 130, the end cap 150, and ring structures 198 and 250 are internally connected. The interior attachment, and bolts 172, are located inside the modules 58 and 130, and spaced inwardly from the exterior surfaces 75 of the modules 58 and 130. Again, it will be appreciated that the length of the buoyancy modules 58 and 130 cause the walls to act as long lever arms. It will also be appreciated that the interior attachments act as pivot points or fulcrums, about with walls of the buoyancy modules 58 and 130 may pivot slightly. Thus, the force of the internal pressure $P_a$ forcing the walls of the modules 58 and 130 outwardly causes the end of the modules 58 and 130 to be forced against the ring structures, enhancing the seal. The upper end 70 of the first buoyancy module 58 pivots slightly about the internal attachment, or bolts 172, and is forced against the ring structure 160 of the end cap 150, indicated by arrow 320, enhancing the seal 168 between the buoyancy module 58 and end cap 150. Similarly, the lower end 74 of the first buoyancy module 58 pivots slightly about the internal attachment, and is forced against the ring structure 250, indicated by arrow 324. Likewise, the upper end 134 of the second buoyancy module 130 pivots slightly about the internal attachment, and is forced against the ring structure 250, indicated by arrow 328. Thus, the ring structure 130 is squeezed between the first and second buoyancy modules 58 and 130, enhancing the seals 262 and 266 between the first and second modules 58 and 130.

The walls of the buoyancy modules 58 and 130 may have a varying thickness. For example, the ends 70, 74 and 134 may have a thicker wall thickness at the connections, and taper towards thinner wall sections. The thinner wall sections may facilitate expansion of the modules 58 and 130, while the thicker sections remain more rigid and strong at the connections.

A method for testing the seal integrity of the buoyancy system 10 includes attaching the buoyancy module to the ring structure. As stated above, the first buoyancy module 58 may be attached to the ring structure 160 of the end cap 150. Similarly, the first and second buoyancy modules 58 and 130 may be attached to the ring structure 250. A pressure differential may be created in the grooves between the flanges and the ring structures to determine if the seals meet predetermined specifications, or leak. The assembly and testing may be performed prior to installing the buoyancy system 10 to a riser, and/or submerging the buoyancy system 10. In addition, the testing may be performed subsequent to installation and submersion.

It will be noted that the vessel 62 of the buoyancy module 58 described above may be attached directly to the riser 46, rather than the stem pipe 78.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A buoyancy system for a riser that is a part of a deep water floating platform, comprising:
    a) a stem pipe configured to receive the riser therethrough;
    b) a pipe flange, attached to the stem pipe;
    c) an end cap including an end cap flange attached to the pipe flange of the stem pipe;
    d) a ring structure, attached to the end cap;
    e) a buoyancy module having an interior cavity through which the stem pipe extends, and a flange located at an upper end of the buoyancy module that extends into the interior cavity and abuts to the ring structure; and
    f) fastening means, engaging the ring structure and the flange, for fastening the flange to the ring structure.

2. A buoyancy system in accordance with claim 1, further comprising:
    a) a seal, formed between the flange of the buoyancy module and the ring structure, including:
        i) a groove, formed between the flange and the ring structure; and
        ii) a seal member, disposed in the groove and contacting both the flange and the ring structure; and
    b) a test port, extending to and in fluid communication with the groove of the seal.

3. A buoyancy system in accordance with claim 2, further comprising:
    a) a fluid conduit, connected to the test port; and
    b) a compressor, connected to the fluid conduit, configured to create an increased pressure in the groove.

4. A buoyancy system in accordance with claim 2, further comprising:
    a pressure gauge, coupled to the test port, configured to measure a pressure drop in the groove.

5. A buoyancy system in accordance with claim 2, further comprising:
    a dye, disposed between the flange and the ring structure, configured to identify leaks.

6. A buoyancy system in accordance with claim 2, wherein the groove is formed in the flange of the buoyancy module; and wherein the test port is formed in the buoyancy module.

7. A buoyancy system in accordance with claim 2, wherein the seal member is an O-ring.

8. A buoyancy system in accordance with claim 2, wherein the seal is a dual seal, and the groove and seal member are a first groove and a first seal member, respectively; and wherein the dual seal further includes:
    a) a second groove, formed between the flange and the ring structure; and
    b) a second seal member, disposed in the second groove and contacting both the flange and the ring structure.

9. A buoyancy system in accordance with claim 1, wherein the buoyancy module includes a material and has a thickness that together are configured to allow a wall of the buoyancy module to expand outwardly under an internal pressure and to force the flange against the ring structure to enhance sealing between the flange and ring structure.

10. A buoyancy system in accordance with claim 1, wherein the buoyancy module is a first buoyancy module having a second flange located on a lower end of the first buoyancy module; and further comprising:
    a second ring structure, attached to the second flange at the lower end of the first buoyancy module;
    a second buoyancy module having an interior cavity and a flange that extends into the interior cavity and abuts to the second ring structure, such that the second ring structure is disposed between the first and second buoyancy modules; and
    fastening means for fastening the second flange of the first buoyancy module and the flange of the second buoyancy module to the second ring structure.

11. A buoyancy system in accordance with claim 1, wherein the buoyancy module includes a vessel with a composite vessel wall.

12. A buoyancy system in accordance with claim 11, further comprising:
    a riser, configured to extend vertically substantially between an ocean surface and an ocean floor, and having a length greater than 1000 feet.

13. A buoyancy system in accordance with claim 11, wherein the composite vessel wall has a decrease in weight when submerged between approximately 25 to 75 percent.

14. A buoyancy system in accordance with claim 1, wherein the buoyancy module includes a vessel with a vessel wall, the vessel wall having a varying thickness.

15. A buoyancy system for a riser that is part of a deep water floating platform, comprising:
   a) a ring structure, configured to be coupled to the riser;
   b) a first buoyancy module having an interior cavity and a first flange that extends into the interior cavity and that abuts to the ring structure;
   c) a second buoyancy module having an interior cavity and a second flange that extends into the interior cavity and abuts to the ring structure, such that the ring structure is disposed between the first and second buoyancy modules;
   d) fastening means, engaging the first and second flanges, for fastening the first and second flanges to the ring structure;
   e) a seal, formed between at least one of the flanges and the ring structure, including:
      i) a groove, formed between at least one of the flanges and the ring structure; and
      ii) a seal member, disposed in the groove and contacting the ring structure; and
   f) a test port, extending to and in fluid communication with the groove of the seal.

16. A buoyancy system in accordance with claim 15, further comprising:
   a) a fluid conduit, connected to the test port; and
   b) a compressor, connected to the fluid conduit, configured to create an increased pressure in the groove.

17. A buoyancy system in accordance with claim 15, further comprising:
   a pressure gauge, coupled to the test port, configured to measure a pressure drop in the groove.

18. A buoyancy system in accordance with claim 15, further comprising:
   a dye, disposed between the flange and the ring structure, configured to identify leaks.

19. A buoyancy system in accordance with claim 15, wherein the groove is formed in the at least one of the flanges of the buoyancy modules; and
   wherein the test port is formed in at least one of the buoyancy modules.

20. A buoyancy system in accordance with claim 15, wherein the seal member is an O-ring.

21. A buoyancy system in accordance with claim 15, wherein the seal is a dual seal, and the groove and seal member are a first groove and a first seal member, respectively; and wherein the dual seal further includes:
   a) a second groove, formed between at least one of the flanges and the ring structure; and
   b) a second seal member, disposed in the second groove and contacting the ring structure.

22. A buoyancy system in accordance with claim 15, wherein the first buoyancy module further includes a second flange located at an upper end of the first buoyancy module; and further comprising:
   a second ring structure, attached to the second flange at the upper end of the first buoyancy module;
   an end cap, attached to the second ring structure and configured to be coupled to the riser to couple the ring structure to the riser.

23. A buoyancy system in accordance with claim 22, further comprising:
   a) a stem pipe, extending concentrically within the buoyancy modules and configured to receive the riser therethrough;
   b) a pipe flange, attached to the stem pipe; and
   wherein the end cap includes an end cap flange, attached to the pipe flange of the stem pipe, to couple the end cap, ring structure, and buoyancy modules to the stem pipe, and thus the riser.

24. A buoyancy system in accordance with claim 15, wherein the buoyancy modules include a material and has a thickness that together are configured to allow a wall of the buoyancy modules to expand outwardly under an internal pressure and to force the flanges against the ring structure to enhance sealing between the flanges and the ring structure.

25. A buoyancy system in accordance with claim 15, wherein the buoyancy modules each include a vessel with a composite vessel wall.

26. A buoyancy system in accordance with claim 25, further comprising:
   a riser, configured to extend vertically substantially between an ocean surface and an ocean floor, and having a length greater than 1000 feet.

27. A buoyancy system in accordance with claim 25, wherein the composite vessel wall has a decrease in weight when submerged between approximately 25 to 75 percent.

28. A buoyancy system for a riser that is part of a deep water floating platform, comprising:
   a) a ring structure, configured to be coupled to the riser;
   b) a buoyancy module having a wall, an exterior surface, an interior cavity and a flange that extends into the interior cavity and abuts to the ring structure;
   c) fastening means, engaging the ring structure and the flange, for fastening the flange to the ring structure; and
   d) the buoyancy module being formed of a material and having a thickness that together are configured to allow the wall to expand outwardly under an internal pressure and to force the flange against the ring structure to enhance sealing between the flange and ring structure.

29. A buoyancy system in accordance with claim 28, further comprising:
   a) a seal, formed between the flange of the buoyancy module and the ring structure, including:
      i) a groove, formed between the flange and the ring structure; and
      ii) a seal member, disposed in the groove and contacting both the flange and the ring structure; and
   b) a test port, extending to and in fluid communication with the groove of the seal.

30. A buoyancy system in accordance with claim 29, further comprising:
   a) a fluid conduit, connected to the test port; and
   b) a compressor, connected to the fluid conduit, configured to create an increased pressure in the groove.

31. A buoyancy system in accordance with claim 29, further comprising:
   a pressure gauge, coupled to the test port, configured to measure a pressure drop in the groove.

32. A buoyancy system in accordance with claim 29, further comprising:
   a dye, disposed between the flange and the ring structure, configured to identify leaks.

33. A buoyancy system in accordance with claim 29, wherein the groove is formed in the flange of the buoyancy module; and 34. A buoyancy system in accordance with claim 29, wherein the seal member is an O-ring.

35. A buoyancy system in accordance with claim 29, wherein the seal is a dual seal, and the groove and seal member are a first groove and a first seal member, respectively; and wherein the dual seal further includes:
   a) a second groove, formed between the flange and the ring structure; and
   b) a second seal member, disposed in the second groove and contacting both the flange and the ring structure.

36. A buoyancy system in accordance with claim 28, wherein flange is located at an upper end of the buoyancy module, and the upper end of the buoyancy module is attached to the ring structure; and further comprising:
   an end cap, attached to the ring structure and coupled to the riser to couple the ring structure to the riser.

37. A buoyancy system in accordance with claim 36, further comprising:
   a) a stem pipe, extending concentrically within the buoyancy module and configured to receive the riser therethrough;
   b) a pipe flange, attached to the stem pipe; and
   wherein the end cap includes an end cap flange, attached to the pipe flange of the stem pipe, to couple the end cap, ring structure, and buoyancy module to the stem pipe, and thus the riser.

38. A buoyancy system in accordance with claim 28, wherein the buoyancy module is a first buoyancy module, the flange is a first flange, the first flange is located on a lower end of the first buoyancy module, and the lower end of the first buoyancy module is attached to the ring structure; and further comprising:
   a second buoyancy module having an interior cavity and a second flange that extends into the interior cavity and abuts to the ring structure, such that the ring structure is disposed between the first and second buoyancy modules; and
   wherein the fastening means engages the ring structure and both the first and second flanges, for fastening the first and second flanges to the ring structure.

39. A buoyancy system in accordance with claim 38, wherein the second buoyancy module is formed of a material and has a thickness that together are configured to allow a wall of the second buoyancy module to expand outwardly under an internal pressure and to force the second flange against the ring structure to enhance sealing between the second flange and ring structure.

40. A buoyancy system in accordance with claim 28, wherein the buoyancy module includes a vessel with a composite vessel wall.

41. A buoyancy system in accordance with claim 40, further comprising:
   a riser, configured to extend vertically substantially between an ocean surface and an ocean floor, and having a length greater than 1000 feet.

42. A buoyancy system in accordance with claim 40, wherein the composite vessel wall has a decrease in weight when submerged between approximately 25 to 75 percent

* * * * *